United States Patent [19]
Dahl

[11] 3,874,152
[45] Apr. 1, 1975

[54] GRASS CATCHER UNIT FOR ROTARY LAWNMOWERS

[75] Inventor: Einar S. Dahl, Galesburg, Ill.

[73] Assignee: Outboard Marine Corporation, Waukegan, Ill.

[22] Filed: Oct. 12, 1973

[21] Appl. No.: 405,831

[52] U.S. Cl................................ 56/202, 15/347
[51] Int. Cl............................................ A01d 35/22
[58] Field of Search........ 56/202; 15/347, 349, 350, 15/351

[56] References Cited
UNITED STATES PATENTS

| | | | |
|---|---|---|---|
| 1,999,826 | 4/1935 | Snell | 15/351 |
| 2,352,504 | 6/1944 | White | 15/351 |
| 2,418,371 | 4/1947 | Smellie | 15/347 |
| 2,955,402 | 10/1960 | Strasel | 56/202 |
| 3,321,893 | 5/1967 | Leader | 56/202 |
| 3,393,500 | 7/1968 | MacLeod et al. | 56/202 |
| 3,503,192 | 3/1970 | Berg et al. | 56/202 |

Primary Examiner—Louis G. Mancene
Assistant Examiner—J. N. Eskovitz
Attorney, Agent, or Firm—Michael, Best & Friedrich

[57] ABSTRACT

Disclosed herein is a grass catcher unit for a rotary mower including a flexible, non-self supporting, disposable collection bag for collecting the grass clippings and a carrier sack for carrying the collection bag and having a mouth which is adapted for connection to the mower discharge outlet. The disposable collection bag is removably mounted inside the carrier sack with the inlet thereof in communication with the discharge outlet. The air stream laden with grass clippings being discharged from the mower "balloons" the disposable collection bag inside the carrier bag so that grass clippings can be collected in the disposable collection bag. After the collection bag is filled or mowing has been completed, the full or partially full collection bag is removed from the carrier sack for disposal and a replacement collection bag is installed inside the carrier bag for the next mowing operation.

11 Claims, 4 Drawing Figures

PATENTED APR 1 1975                    3,874,152

3,874,152

GRASS CATCHER UNIT FOR ROTARY LAWNMOWERS

BACKGROUND OF THE INVENTION

This invention relates to rotary lawnmowers and, more particularly, to grass catcher units for rotary lawnmowers.

Rotary lawnmowers are typically adapted for detachable connection of an attachable bag in which grass clippings and other comminuted debris are collected. When the collection bag becomes full, it is detached from the mower and the contents emptied into another container for disposal. Considerable handling is involved in transferring the grass clippings from the collection bag to a disposal container. Use of thin plastic bags as disposable containers has become widespread, particularly in areas where a curb side trash collection service is provided. These disposable plastic bags are quite flimsy, and accordingly, it is a rather cumbersome task to empty the grass clippings from the collection bag into the plastic bag without spilling.

SUMMARY OF THE INVENTION

To eliminate transfer of the collected grass clippings from a collection bag to a disposable container, the invention provides a grass catcher unit which is arranged so that grass clippings and other debris are collected in a disposable bag made from an inexpensive, light weight material. In the broadest aspect, the invention provides a non-self supporting disposable bag for collecting grass clippings discharged from the mower discharge outlet and having an inlet, means for removably locating the inlet of said disposable collection bag in communication with the mower discharge outlet, and means for supporting the disposable collection bag from the mower.

More specifically, the invention provides a grass catcher unit including a carrier sack which is connected to the outlet of a discharge chute of a rotary mower housing and carries the disposable collection bag. The carrier sack includes means located in the vicinity of the mouth thereof for removably connecting the inlet of the disposable collection bag in communication with the discharge chute outlet and closure means for affording access to the disposable collection bag and for facilitating the installation and removal of the collection bag.

In accordance with a preferred embodiment of the invention, the connection between the inlet of the disposable collection bag and the carrier sack is provided by a collar assembly including a pair of axially spaced hoops over which the bag inlet is installed and an elastic band surrounding the bag inlet and located between the hoops. The carrier sack is arranged to define a compartment or cavity for accommodating and supporting the disposable collection bag when it is expanded or ballooned by the pressurized air stream generated by the mower cutter blade.

When the disposable bag becomes filled or mowing has been completed, a side panel or flap, provided on the carrier bag for affording access to the disposable bag, is opened and the disposable bag is removed from the carrier sack for disposal. A replacement disposable bag is then installed in the carrier sack for the next mowing operation.

A primary feature of the invention is the provision of a grass catcher unit for a rotary mower which unit is arranged so that the grass clippings and other debris being discharged from the mower can be collected directly for disposal in an inexpensive disposable collection bag.

Other features and advantages of the invention will become apparent upon reviewing the following detailed description, the drawing, and the appended claims.

DESCRIPTION OF THE PREFERRED EMBODIMENTS

Figure 1:
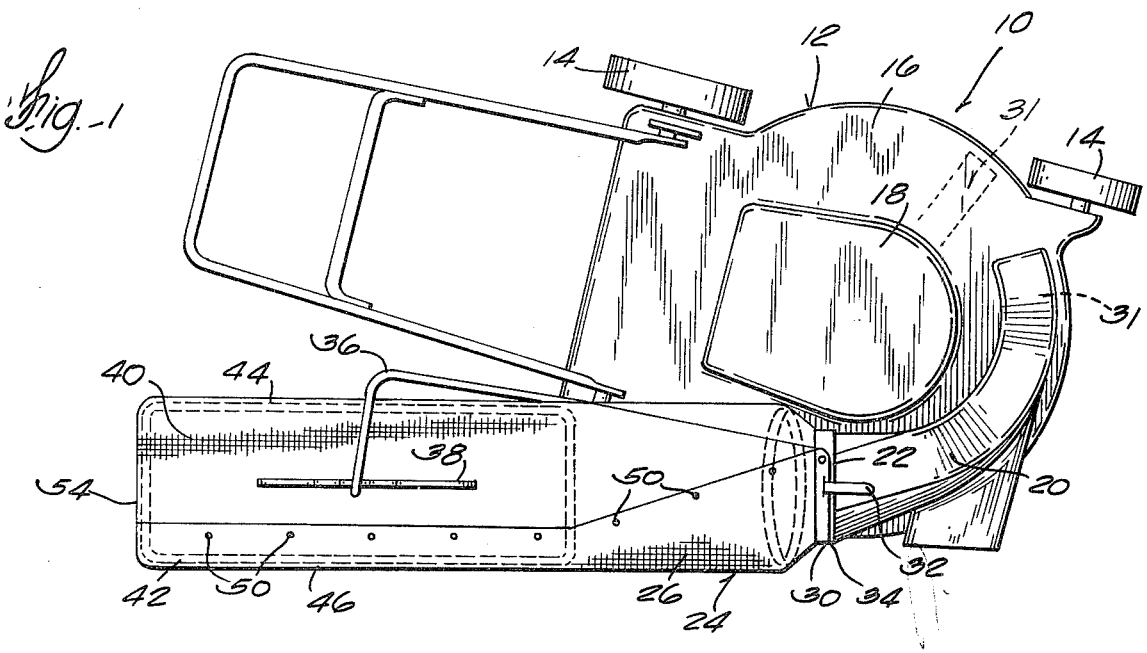
FIG. 1 is a perspective view of a grass catcher unit which embodies various of the features of the invention and which is attached to a rotary mower.

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

Illustrated in the drawing is a rotary lawnmower 10 including a blade housing 12 which is supported for travel in spaced relation above the ground by a plurality of ground-engaging wheels 14 (two shown). Supported on the top deck 16 of the blade housing 12 is a prime mower 18, such as an internal combustion engine. The blade housing 12 includes a discharge chute 20 having an outlet 22. Inasmuch as the blade housing and the engine form no part of the invention, further detailed illustration or description is not necessary.

In accordance with the invention, there is provided a grass catcher unit 24 including a carrier sack 26 which is connected to the discharge chute outlet 22 and a non-self supporting disposable collection bag 28 which has an inlet 29 and is supportingly carried inside the carrier sack 26 for collecting the grass clippings and other comminuted debris being discharged from the interior of the blade housing 12 through the discharge chute 20 by a rotating cutter blade 31 (shown fragmentarily and by dashed lines in FIG. 1).

The carrier sack 26 preferably is made from a relatively flexible, durable material, such as a durable fabric, and has a mouth 30 adapted for communication with the discharge chute outlet 22. The carrier sack 26 is attached to the discharge chute outlet 22 by a releasable connection means, such as a spring latch 32, which engages a wire frame 34 surrounding the mouth 30 of the carrier sack 26. The carrier sack 26 is supported by a support rod 36 which extends upwardly from the top deck 16 of the blade housing 12 and, at the outer end, fits into a support strap 38 provided on the top portion 40 of the carrier sack 26. Various alternate means can be used to attach and support the carrier sack 26. Such means form no part of the invention so illustration or detailed description thereof is not necessary for a full understanding of the invention.

When the carrier sack 26 is made from a flexible material, means are provided for maintaining the side walls 44 and 46 of the carrier sack 26 spaced apart so as to define a compartment or cavity for receiving and supporting the disposable collection bag 28 and for accommodating full expansion or ballooning of the collection bag 28 by the pressurized air stream from the discharge chute 20. While various arrangements can be used, in the specific construction illustrated, such means includes a rectangular wire spreader frame 42 which is sewn into or otherwise attached to the top portion 40 of the carrier sack 26 to maintain the side walls 44 and 46 in spaced relationship so as to define a cavity 47.

Figure 2:
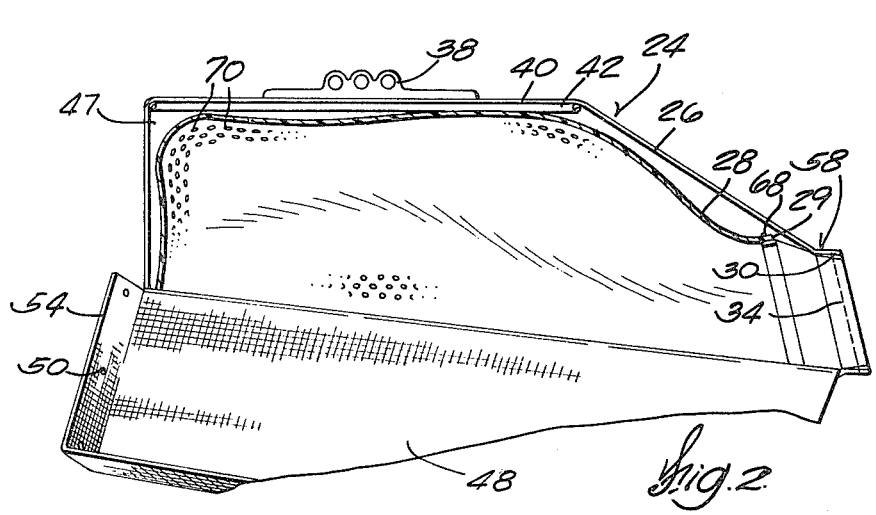
FIG. 2 is a side elevational view of the grass catcher unit of FIG. 1, shown with a side panel or flap in a folded down position to permit access to the disposable collection bag.
Figure 3:
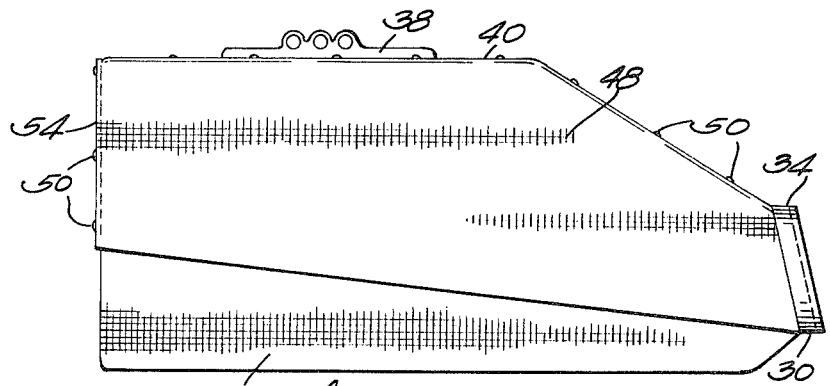
FIG. 3 is a side elevational view of the grass catcher unit of FIG. 1 shown with the side panel or flap in the closed position.
Figure 4:
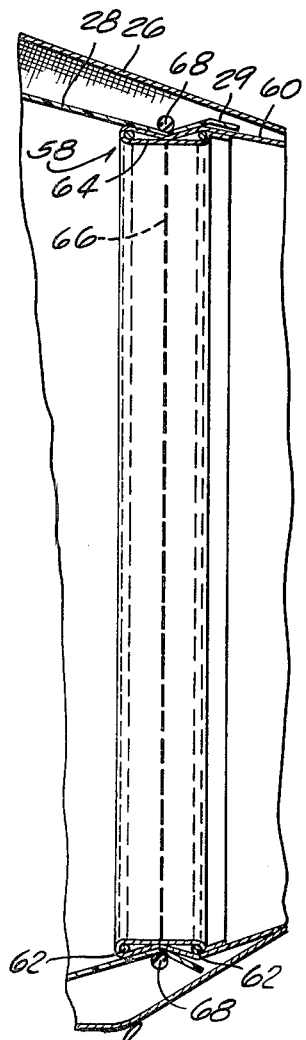
FIG. 4 is an enlarged, fragmentary side elevational view, partially sectioned, showing the connection of the disposable bag inlet to the carrier sack.

The side wall 46 of the carrier sack 26 is provided with a panel or flap 48 which folds downwardly, as shown in FIG. 2, to facilitate the installation and removal of the collection bag 28. The side flap 48 is detachably fastened in a closed position by suitable fastening means, such as by a plurality of snaps 50 spaced along the top portion 40 and the end portion 54 of the carrier sack (See FIGS. 1 and 3).

The carrier sack 26 includes means adapted for removably mounting the inlet 29 of the collection bag 28 so as to maintain the inlet 29 open and in communication with the mouth 30, and thus in communication with the discharge chute outlet 22, so that the air stream laden with gas clippings and with other comminuted material being discharged through the discharge chute 20 is directed into the disposable bag 28. While various arrangements can be used, in the specific construction illustrated, such means includes a collar assembly 58 having an annular skirt 60 which, at the forward end, is connected to the interior of the carrier sack 26 adjacent the mouth 30 and extends rearwardly of the mouth 30.

The collar assembly 58 also includes a pair of axially spaced, circular wire hoops 62 located at the rear portion of the skirt 60. The skirt 60 is preferably made from the same type of material as the carrier sack 26 and is sewn or otherwise secured to the interior of the carrier sack 26. The hoops 62 are enclosed within a hem 64 formed from the skirt material and are maintained in axially spaced relationship by a seam 66 located in the hem 64 between the hoops 62. The inlet 29 of the disposable bag 28 encircles the hoops 62 and is securely held in place therebetween by an elastic band 68.

The disposable collection bag 28 is preferably fabricated from an inexpensive, light weight material, such as from a thin sheet plastic material, and is dimensioned such that when, fully expanded or ballooned by the pressurized air from the discharge chute 20, it roughly fills the cavity 47 defined inside the carrier sack 26. The disposable collection bag 28 preferably is sufficiently permeable to permit air to vent therefrom so it can be completely filled with grass clippings. When made from a plastic material or similar substantially impermeable material, the disposable collection bag 28 is provided with a plurality of small perforations 70 (See FIG. 2) through which the air can vent. The perforations are sized to prevent passage of a substantial quantity of grass clippings or other debris.

When the disposable collection bag 28 becomes filled with grass clippings or mowing is completed, the side flap 48 of the carrier sack 26 is unfastened and folded down, the elastic band 68 is stretched and moved forwardly on the collar assembly 58 to permit the inlet 29 of the disposable collection bag 28 to be removed from the collar assembly 58, and the filled or partially filled disposable collection bag 28 is then removed from the carrier sack 26 for disposal. If desired, the inlet 29 of the collection bag 28 is tied shut with a cord or wire before removal of the bag from the carrier sack 26. A replacement disposable collection bag 28 is installed by placing the inlet 29 thereof over the collar assembly 58 and moving the elastic band 68 into place between the hoops 62. The side flap 48 is then closed and the mower is then ready for mowing. Once the mower is started, the pressurized air stream generated by the cutter blade expands or balloons the disposable bag 28 and the bag is ready to collect grass clippings or other debris.

From the above detailed description it will be apparent that means, other than a carrier sack, can be used for removably locating the inlet 29 of the collection bag 28 in communication with the discharge chute outlet 22 and for supporting the collection bag 28. For example, there can be provided a coupling assembly including a discharge chute outlet connecting means which is arranged in the same general manner as the mouth portion of the carrier sack 26 and a collection bag inlet connecting means which is arranged in the same general manner as the collar assembly 58. The collection bag 28 can be supported by a sling assembly which is supported in a suitable manner from the mower and includes one or more straps or the like for cradling the collection bag 28.

Various of the features of the invention are set forth in the following claims.

I claim:

1. A rotary mower comprising a blade housing carrying a rotary cutter blade and having a grass clipping discharge outlet, a disposable collection bag for collecting grass clippings discharged from said outlet and having an inlet, a flexible carrier sack having an interior for carrying said collection bag and having a mouth connected to said outlet, and means on said carrier sack in the vicinity of said mouth for engagement with said collection bag for maintaining said inlet open and for removably locating said collection bag in communication with said outlet.

2. A rotary mower according to claim 1 including closure means on said carrier sack for affording access to the interior of said carrier sack and for facilitating the installation of said collection bag into and the removal of said collection bag from said carrier sack.

3. A rotary mower according to claim 1 wherein said means for maintaining said inlet open and for locating said inlet includes an annular collar assembly which extends rearwardly from said mouth and over which the inlet of said collection bag fits, and means for removably holding the inlet of said collection bag on said collar assembly.

4. A rotary mower according to claim 3 wherein said collar assembly includes an annular skirt having a forward end portion connected to the interior of said carrier sack adjacent said mouth and a rear end portion and a pair of axially spaced hoops attached to the rear end portion of said skirt and surrounded by the inlet of said collection bag.

5. A rotary mower according to claim 4 wherein said holding means comprises an elastic band adapted to fit over said collection bag between said hoops.

6. A rotary mower according to claim 2 wherein said carrier sack is made from a flexible material, has side walls, and includes means for maintaining said side walls in spaced relationship so as to define a compartment for accommodating said collection bag.

7. A rotary mower according to claim 5 wherein said closure means comprises a closable flap in one of said carrier sack side walls.

8. A rotary mower according to claim 1 wherein said collection bag is made from a flexible, thin sheet material and includes a plurality of perforations for permitting said collection bag to be fully expanded within said carrier sack by a pressurized air stream generated by said cutter blade.

9. A rotary mower comprising a blade housing carrying a rotary blade and having a grass clipping discharge outlet, a disposable collection bag for collecting grass clippings discharged from said outlet and having an inlet, said collection bag being made from a flexible, thin sheet material and including a plurality of perforations for permitting said collection bag to be fully expanded by a pressurized air stream generated by said cutter blade, a carrier sack being made from a flexible material and having side walls, an annular collar assembly located inside said carrier sack in the vicinity of said mouth and extending rearwardly from said mouth for engagement with said collection bag to maintain said inlet open and to removably locate said inlet of said collection bag in communication with said outlet, the inlet of said collection bag fitting over said collar assembly, means for removably holding the inlet of said collection bag on said collar assembly, and a closable flap in one of said carrier sack side walls for affording access to the interior of said carrier sack and for facilitating the installation of said collection bag into and the removal of said collection bag from said carrier sack.

10. A grass catcher unit for a rotary lawn mower having a grass clipping discharge outlet comprising a disposable collection bag having an inlet, a flexible carrier sack having an interior for carrying said collection bag and a mouth adapted for connection to the mower discharge outlet, means on said carrier sack in the vicinity of said mouth for engagement with said collection bag to maintain said inlet open and to removably locate said collection bag inlet in position for communication with the mower discharge outlet, and closure means on said carrier sack for affording access to the interior of said carrier sack and for facilitating the installation of said collection bag into and the removal of said collection bag from said carrier sack.

11. A rotary mower comprising a blade housing carrying a rotary cutter blade and having a grass clipping discharge outlet, a non-self supporting disposable bag for collecting grass clippings discharged from said outlet and having an inlet, and means for supporting said disposable collection bag from said blade housing and including an outer flexible container supported from said blade housing and housing said disposable bag, said outer container including a mouth communicating with said discharge outlet, said outer container also including means communicating with said mouth and engaging said disposable bag for maintaining said inlet open and in communication with said mouth.

* * * * *

PO-1050
(5/69)

UNITED STATES PATENT OFFICE
CERTIFICATE OF CORRECTION

Patent No. 3,874,152         Dated April 1, 1975

Inventor(s)    Einar S. Dahl

It is certified that error appears in the above-identified patent and that said Letters Patent are hereby corrected as shown below:

Column 5, line 12,        delete "5", insert ---6---.

Column 4, line 51,        after "bag", insert ---inlet---.

Signed and Sealed this eleventh Day of November 1975

[SEAL]

Attest:

RUTH C. MASON
Attesting Officer

C. MARSHALL DANN
Commissioner of Patents and Trademarks